Jan. 7, 1941.   J. W. CONVERSE ET AL   2,227,806
EXTERIOR HEAT AND LIGHT CONTROL APPARATUS
FOR AIR CONDITIONED ENCLOSURES
Filed May 27, 1938   3 Sheets-Sheet 3
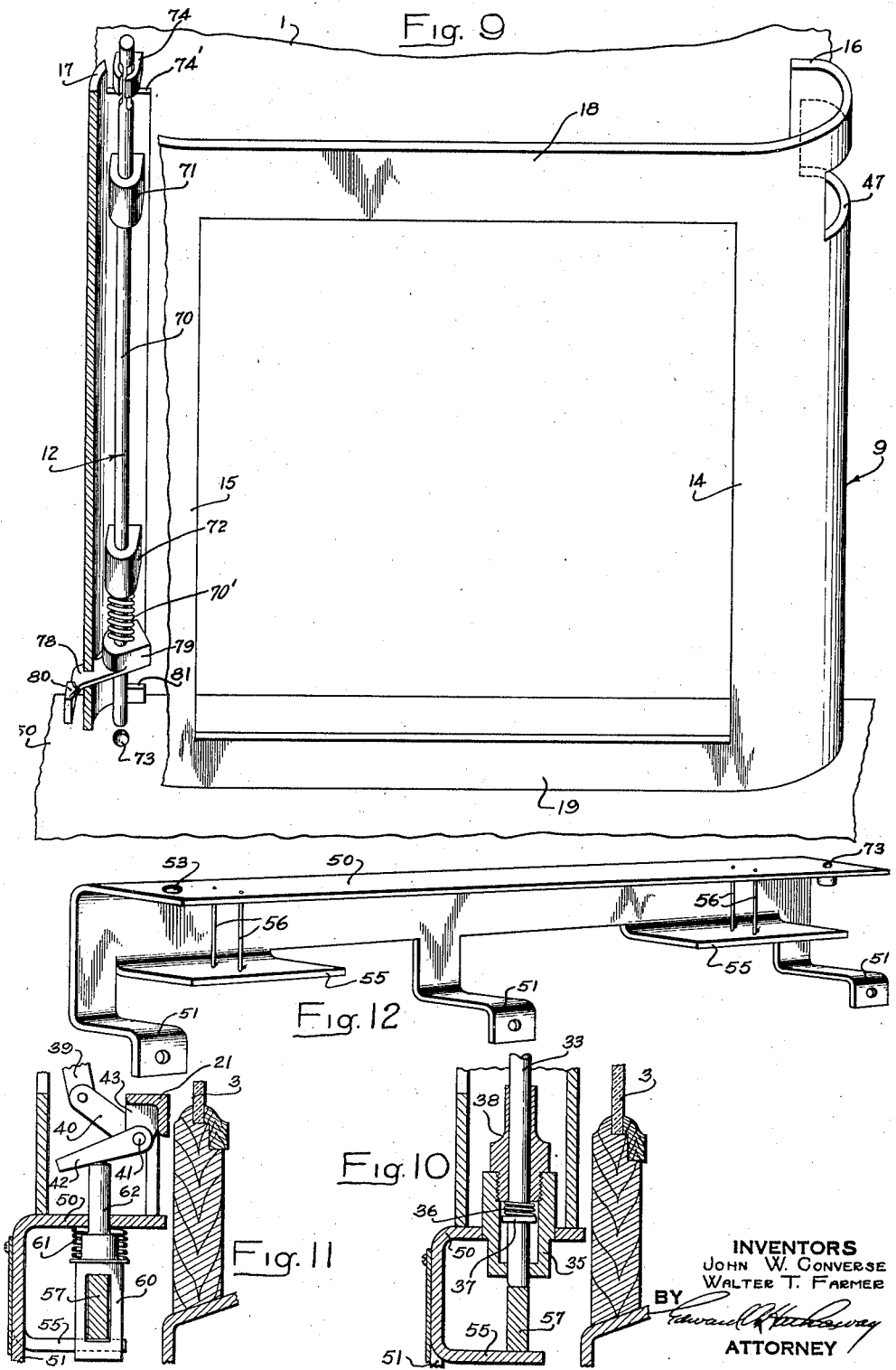
INVENTORS
JOHN W. CONVERSE
WALTER T. FARMER
BY
ATTORNEY Patented Jan. 7, 1941

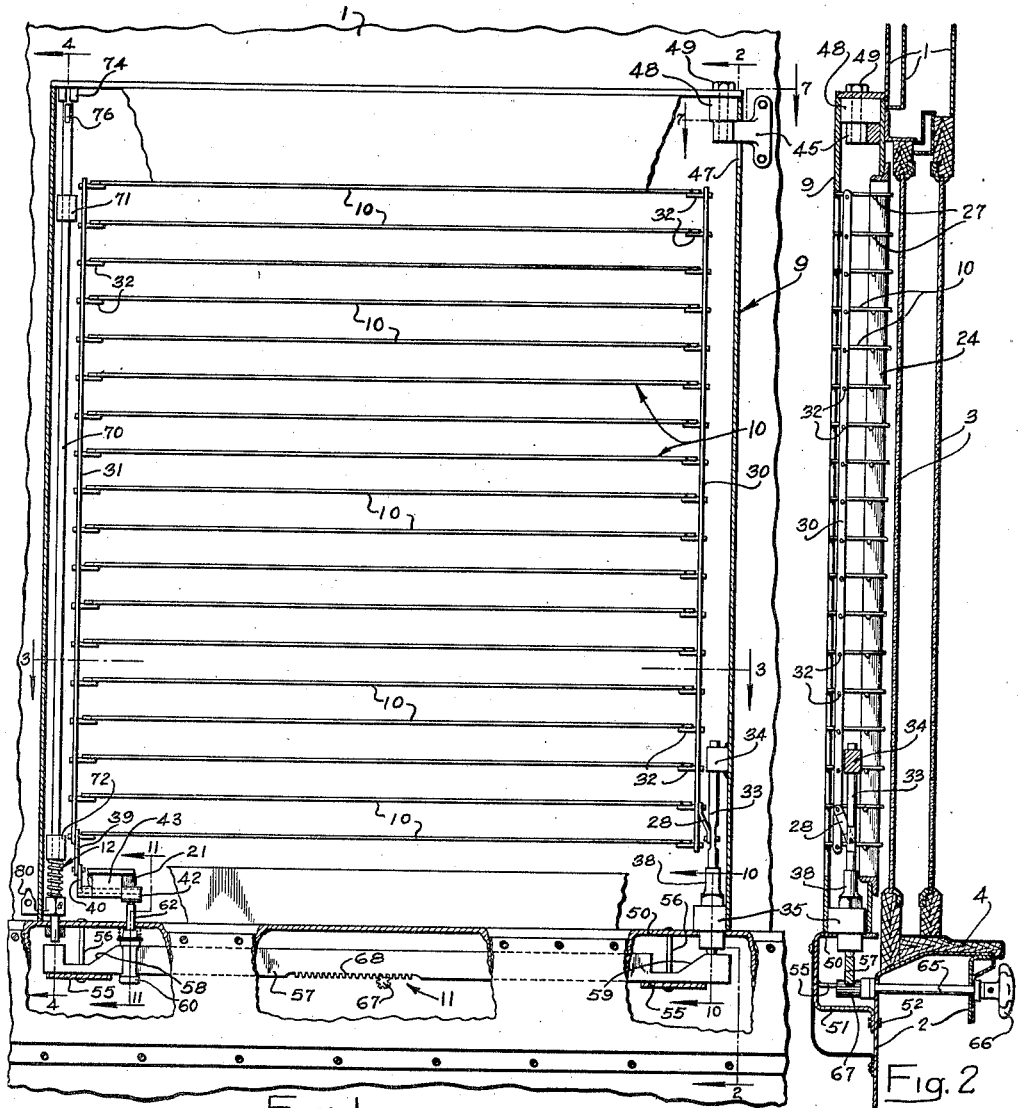

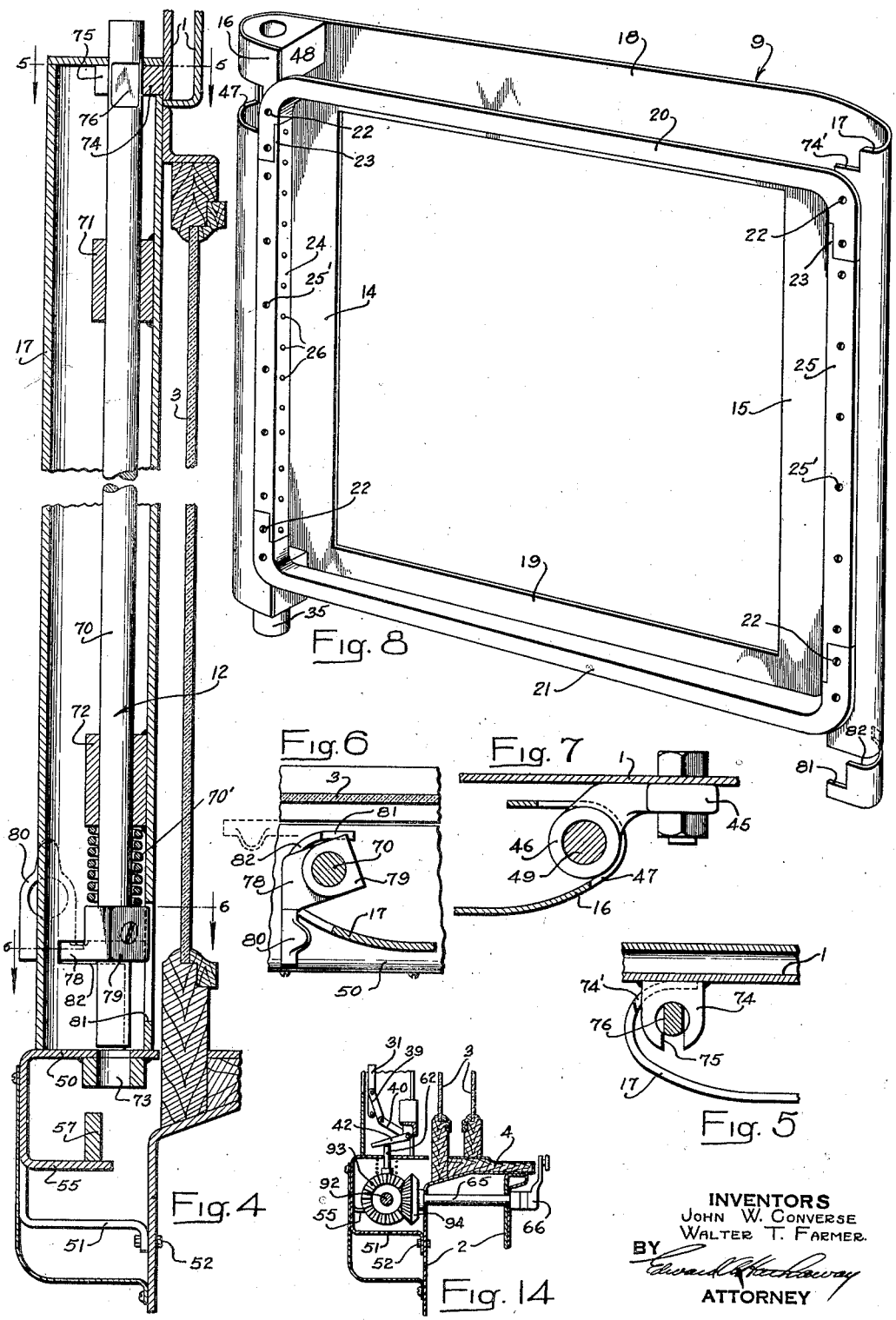

2,227,806

UNITED STATES PATENT OFFICE 2,227,806

EXTERIOR HEAT AND LIGHT CONTROL APPARATUS FOR AIR CONDITIONED ENCLOSURES

John W. Converse, Rosemont, and Walter T. Farmer, Philadelphia, Pa.

Application May 27, 1933, Serial No. 210,484

3 Claims. (Cl. 268—96)

This invention relates generally to the field of controlling air temperature especially in railroad cars and relates more particularly to apparatus for preventing transmission of heat through a window into the interior of an enclosure such as a car but at the same time insuring proper passage of light into the same, the control of the air temperature hereinafter being broadly referred to as air conditioning.

Air conditioning of railway cars has presented many peculiar and difficult problems arising from various conditions such as the relatively large surface exposure of the car in combination with a great multiplicity of windows on each side thereof. The windows on one side of a car may be exposed to the full sun rays while simultaneously the windows on the opposite side are on the shady side of the car. Or these conditions may periodically reverse during the day's travel depending upon the curves of the railroad track. Another difficulty is that the length of the passenger space within the car requires constant circulation of cooled air therein and this taken with the fact that a passenger is normally seated within the car adjacent a window which may be on the sunny side is apt to cause an abnormal feeling of both heat and cold. While this condition can be overcome by drawing down the window shade, yet this has the serious disadvantages of not only obstructing passage of light into the car but also of allowing the sun's heat rays to enter the car, thereby imposing a very large load upon the air conditioning apparatus. This additional load may be of considerable magnitude on hot summer days or when travelling through desert country or southern climates.

It is an object of our invention to provide improved means whereby all of the disadvantages above mentioned may be effectively overcome without incurring any of the disadvantages thereof. To this end, improved sun radiation deflecting means are associated with each window in such a manner as to prevent infiltration of the sun's heat rays and thereby minimize placing additional load on the air conditioning equipment as well as minimizing abnormal feeling of discomfort by a passenger due to simultaneous presence of heat and cold.

A further object of our invention is to provide improved means for adequately and safely supporting and housing said radiation blinds on the outside of the car window and to allow such blinds to be adjusted, by a passenger from within the car, in accordance with varying directions of the sun rays.

A further object is to provide an improved sun radiation apparatus placed outside of a car window, or window of any other air conditioned enclosure, and arranged so as to permit the apparatus to be readily moved away from the window to permit unobstructed access to the surface thereof for purposes of cleaning, inspecting or repairing the same. Another object in this respect is to provide improved blind adjusting means in combination with the foregoing structure which allows movement of the apparatus away from the window, whereby certain parts of the apparatus and adjusting means are adapted to be readily separated from each other upon occurrence of said movement or to be reestablished when the apparatus is moved back to its normal position in front of the window.

Another object is to provide an improved structure for preferably hinging the apparatus on the side of the car and to positively lock the same in position with no possibility of the apparatus becoming unlocked except when deliberately operated for this purpose.

A further object is to provide an improved sun radiation deflecting blind for railway cars that is rugged and relatively simple and economical in operation, construction and maintenance, as well as presenting a pleasing exterior appearance and being readily applied to existing cars.

Other objects and advantages will be more apparent to those skilled in the art from the following description of the accompanying drawings in which:

Fig. 1 is an outside front elevation of our improved sun radiation blind, parts of which are broken away to show details of construction;

Fig. 2 is a transverse section taken on the line 2—2 of Fig. 1;

Fig. 3 is a horizontal section taken on the line 3—3 of Fig. 1;

Fig. 4 is a vertical section taken generally on the line 4—4 of Fig. 1 showing the locking mechanism in its unlocked position contrasted to the locked position shown in Fig. 1;

Fig. 5 is a section on the line 5—5 of Fig. 4;

Fig. 6 is a section on the line 6—6 of Fig. 4;

Fig. 7 is a section on the line 7—7 of Fig. 1;

Fig. 8 is a perspective of the frame viewed from the rear side thereof and with all operating parts removed;

Fig. 9 is a perspective of the front side of the frame with certain parts removed and other parts broken away to shown the relation of the locking mechanism to the frame;

Fig. 10 is a section taken on the line 10—10 of Fig. 1;

Fig. 11 is a section taken on the line 11—11 of Fig. 1;

Fig. 12 is a perspective of the rear side of the member for supporting the frame and for guiding the blind adjusting cam bar;

Fig. 13 is a front elevational view similar to the lower portion of Fig. 1 but showing a modified arrangement for adjusting the blinds, a portion of the supporting member for the adjusting means being shown in section;

Fig. 14 is a transverse section taken on the line 14—14 of Fig. 13.

In the particular embodiments of the invention, such as are disclosed herein merely for the purpose of illustrating certain specific forms among possible others that the invention might take in practice, we have conventionally shown in Fig. 2 the window and side wall structure of a railway car. It will of course be understood that our invention is applicable to various types of window and car constructions, but the present structure will suffice for purposes of illustration. The car side wall includes usual portions 1 and 2 disposed above and below the windows 3 which are herein shown of the double window type. The windows are supported upon usual window sills 4 and between sash frames 5, Fig. 3, supported in any usual manner by the car frame wall 6 located between adjacent windows. Mounted in front of the windows 3 is our improved sun radiation blind generally comprising a main frame 9, Figs. 8 and 9, a series of adjustable sun radiation blind elements 10, blind adjusting mechanism 11, and shutter locking means 12, the blind elements 10 being of any suitable sun deflecting or heat absorbing material such as metal or wood.

The frame 9, as shown in Figs. 8 and 9, has vertical sheet metal sides 14 and 15, which terminate in short reversely curved end portions 16 and 17 and are connected at their upper and lower ends by horizontal sheet metal strip portions 18 and 19. This frame is preferably formed of one piece of sheet metal although it could be fabricated in any suitable manner. As shown in Fig. 8, the reversely curved portions 16 and 17 are cross-connected by upper and lower horizontal angle irons 20 and 21. These angle irons have curved ends with the vertical legs thereof secured as at 22 to the curved portions 16 and 17. The curved ends of the angle iron are also suitably interfitted as at 23 with vertical angle irons 24 and 25. One leg of these vertical angle irons is secured as at 25' to the reversely curved frame portions 16 and 17 while the transverse legs have a series of openings 26 to receive pivot pins 27 formed as part of the series of sun radiation blind slats 10. The slats 10 after being assembled in side pieces 24 and 25 are commonly connected and operated by narrow vertical bars 30 and 31, Fig. 1, at each end of the slats, these bars being pivotally connected thereto as at 32.

To vertically reciprocate bar 30 the same is pivotally connected by a link 28 to a rod 33 which is supported by the U-shaped or reversely curved frame end 16 through a guide lug 34 and a combined spring container and hinge element 35. The elements 34 and 35 are welded or otherwise suitably secured to the reversely bent end 16. As shown in Fig. 10, the rod 33 is normally biased downwardly by a spring 36 which is interposed between a collar 37 formed on rod 33 and a guide collar 38 threaded in the hinge bushing 35. The other operating rod 31 is pivotally connected by a link 39 to an arm 40, Fig. 11, which is secured to one end of a transverse shaft 41 whose other end securely carries a freely projecting arm 42. Shaft 41 is journalled in a suitable bearing 43 which is welded or otherwise suitably secured to angle iron 21. The frame 9, slats 10 and operating mechanism therefor so far described all constitute a self-contained unit.

To movably support the foregoing self-contained unit on the car with an extremely rugged and safe connection therewith and at the same time permit ready accessibility to the window for purposes of cleaning, repairing or inspecting the same, we provide the following means. As shown in Figs. 1 and 7 a bracket 45 is secured to the car frame and has a hinge portion 46 turned outwardly to extend through an opening 47 in the reversely bent portion 16. A boss 48, Figs. 1 and 8, is welded or otherwise suitably secured in the upper corner of the bent portion 16 so as to be pivotally supported on bracket 45 and held thereto by a bolt 49. To support the lower end of frame 9 on the car, the frame rests upon what is herein termed a sill 50 which has three supporting arms 51, Fig. 12, extending downwardly and inwardly for attachment as at 52 to the car side 2, Fig. 2. The lower hinge structure 35 is journalled in a suitable opening 53 of sill 50, Figs. 10 and 12. Guiding supports 55 are bent in from the sill structure 50 so as to underlie the same and are additionally connected thereto by pairs of pins 56. A horizontal cam bar 57, Figs. 1 and 2, is supported on lips 55 and is guided between pins 56. This bar has cam surfaces 58 and 59 extending downwardly from its upper horizontal edge. To adjust the angular position of the slats 10, the lower end of rod 33, Figs. 1 and 10, rides on said upper edge of bar 57. A cam follower 60 is provided with an opening through which the other end of the bar extends, while a spring 61 interposed between the follower 60 and sill 50 urges said follower into contact with said bar. A pin 62, formed as part of the follower, engages arm 42. When cam bar 57 is moved to the right from the position shown in Fig. 1, the inclined cam surfaces 58 and 59 will allow follower 60 and pin 33 to move downwardly under the action of their respective springs 36 and 61, thereby adjusting the angularity of the slats through links and arms 28, 39, 40, 42 and vertical side links 30 and 31, Figs. 1 and 2.

To adjust the longitudinal position of cam bar 57 from within the car, we have provided a shaft 65 extending through the car walls 2 and provided at its inner end with a hand knob or crank 66 to be operated by a passenger while its other end has a pinion 67 meshing with gear teeth 68 formed on the under edge of cam bar 57. While the foregoing adjusting arrangement permits individual passengers to adjust the sun radiation blinds in accordance with the angularity of the sun's rays and in accordance with the amount of light desired, yet it is also necessary to be able to movably support the frame and slats carried thereby without interference from the normally fixed operating rod 65 or associated parts. To this end, it will be noted that the hinge axis of frame 9, Fig. 1, extends through bolt 49 and rod 33, thereby allowing the left end of the frame unit to be moved outwardly while still maintaining contact between rod 33 and cam bar 57. Outward movement of the frame unit will cause arm 42, Fig. 11, to be moved automatically away from and out of contact with pin 62. However, upon swinging the frame unit back into position, the arm 42 will automatically be brought back into superimposed operative relation to pin 62. This provides breakable or separable connecting means adapted to be rendered inoperative upon movement of the frame unit and to be rendered automatically operative when the unit is replaced.

To releasably hold the frame unit in position, we have provided as shown in Figs. 1, 3, 4 and 9 a vertically movable locking rod 70 disposed within the reversely bent frame end 17 and guided in brackets 71 and 72 which are welded or otherwise suitably secured to the rear leg of said portion 17. The lower end of this rod is receivable within an opening 73 formed in the sill 50 while the upper end is receivable in an opening formed in a boss 74, Fig. 5. The boss 74 is welded or otherwise suitably secured to the car frame 1 and extends outwardly therefrom and through a recessed corner 74' formed in the reversely bent portion 17. The boss 74 has a slot 75 through which a flatted portion 76 on the rod is adapted to pass when the frame unit is moved inwardly or outwardly from the car side. When the rod 70 is in its locked position, such as when it extends into hole 73, then the flatted portion 76 is not only rotated 90° from that shown in Fig. 5 but is also moved downwardly under the force of a spring 70', Fig. 4, so that the upper cylindrical end of rod 70 is wholly within the opening of boss 74. The rod is thereby firmly locked against displacement from the boss 74 and opening 75. To lift rod 70 and also rotate the same to unlock the flatted portion 76, we have provided an arm 78 having a hub 79 secured to shaft 70 and provided with an apertured finger grip 80. To allow the arm 78 to move vertically and to be rotated, the lower end of the reversely bent portion 17 is cut out, Fig. 8, with a recess 81 and an arcuate slot 82. When the rod is in its locking position, arm 78 is in its rear position as shown in dotted lines, Fig. 6, in which position arm 78 can move vertically downwardly into recess 81. To unlock the frame, the operator inserts his finger within the apertured finger grip 80 and vertically moves arm 78 upwardly through slot 81 and then rotates said arm forwardly into the arcuate slot 82. The initial upward movement unlocks the rod from recess 73 and also moves the uppermost circular portion of rod 70 out of the opening in boss 74, Fig. 5. The subsequent forward rotation of arm 78 causes flatted portion 76 to be rotated into alignment with slot 75 whereupon the frame can be swung outwardly from the car by the operator pulling outwardly on finger grip 80. It is thus seen that a very positive and yet readily releasable locking arrangement is provided and it is so arranged as to insure utmost safety and ruggedness without unduly encumbering the apparatus or rendering it unsightly.

In the modification shown in Figs. 13 and 14, the vertical rod 33 and the cam follower 60 for adjusting the angularity of the slats are operated by a pair of cams 90 and 91 corresponding generally to the cam surfaces 58 and 59. These cams are simultaneously horizontally reciprocated by a threaded shaft 92 which is rotated by bevel gears 93 and 94, the shaft for gear 94 extending through the car side similar to shaft 65, Fig. 2, for operation from the interior of the car. This modification is otherwise identical in every respect to the preferred form and has the same advantages thereof.

From the disclosure herein it is seen that we have provided an extremely rugged and relatively simple and readily adjustable sun radiation blind that is operative to prevent admission of heat into the car without imposing undue restriction upon passage of light thereto from the outside. Our improved arrangement also permits the frame unit to be readily moved from its normal position or to be replaced therein while having such movement accompanied by an automatic breaking and reestablishment of an operative connection between certain parts of the adjusting structure with no attention required on the part of the operator and without sacrifice of any of the rugged qualities of the apparatus.

It will of course be understood that various changes in details of construction and arrangement of parts may be made by those skilled in the art without departing from the spirit of the invention as set forth in the appended claims.

We claim:

1. In combination, an enclosure having a wall with a window therein, frame normally disposed in front of said window on the outside thereof and pivotally supported by said wall so as to swing relative thereto, angularly adjustable sun radiation slats supported by said frame, and means extending through said wall into said enclosure and having operative connections with said slats to angularly adjust the same, said operative connections including a movable slat operating element, and means whereby said frame has pivotal swinging movement away from or toward the window about the axis of said element thereby allowing the operating element to maintain a predetermined position relative to said frame and wall at all times.

2. In combination, an enclosure having a wall with a window therein, a frame normally disposed in front of said window on the outside thereof and pivotally supported by said wall so as to swing relative thereto, angularly adjustable sun radiation slats supported by said frame, and means extending through said wall into said enclosure and having operative connections with said slats to angularly adjust the same, said operative connections including a plurality of movable slat operating elements and actuating means therefor, one of said elements having an axis substantially coinciding with the pivotal axis of said frame so as to maintain a continuous connection with its said actuating means during swinging movement of said frame while the other of said elements is separable from its said actuating means upon movement of the frame away from said wall.

3. In combination, an enclosure having a wall with a window therein, a frame normally disposed outside of said window and movably supported by said wall, a series of angularly adjustable sun radiation slats supported by said frame, slat adjusting means extending through said wall into said enclosure and having operative connections with said slats including a cam having a variable surface and a cam follower element engageable with said surface whereby the slats are adjusted upon relative movements between said cam surface and follower, means for supporting said cam and cam follower element by said wall, and a separable connection between said follower elements and slats whereby said frame may be moved relative to said wall.

JOHN W. CONVERSE.
WALTER T. FARMER.